(12) United States Patent
Smith et al.

(10) Patent No.: US 8,036,517 B2
(45) Date of Patent: Oct. 11, 2011

(54) PARALLEL DECODING OF INTRA-ENCODED VIDEO

(75) Inventors: Jayson Roy Smith, San Diego, CA (US); Aravind Bhaskara, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1661 days.

(21) Appl. No.: 11/340,378

(22) Filed: Jan. 25, 2006

(65) Prior Publication Data

US 2007/0171975 A1    Jul. 26, 2007

(51) Int. Cl.
H04N 5/93 (2006.01)
(52) U.S. Cl. ........ 386/354; 382/234; 382/239; 386/344; 386/355; 386/356; 375/240.13; 375/240.25
(58) Field of Classification Search .......... 375/240, 375/240.01, 240.25, 240.12–240.17; 386/343–357; 382/232–239
See application file for complete search history.

(56) References Cited

U.S. PATENT DOCUMENTS 5,852,630 A * 12/1998 Langberg et al. ........... 375/219
2006/0067399 A1    3/2006 Zhang

FOREIGN PATENT DOCUMENTS

KR    1020060028847    12/2006

OTHER PUBLICATIONS

Tol et al., "Mapping of H.264 Decoding on a multiprocessor architecture" Proceedings of the SPIE Conference on Image and Video communications and processing 2003, Santa Clara, CA. USA, Jan. 21-24, 2003, pp. 707-718, XP008025096.*
Li, E. et al., "Implementation of H.264 Encoder on General-Purpose Processors with Hyper-Threading Technology" Proceedings of the SPIE Conference on Visual Communications and Image Processing 2004, San Jose, CA, USA., Jan. 20-22, 2004, vol. 5308, No. 1, pp. 384-395, XP002454822.*
Kleiman, Shah, Smaalders (1996) "Programming with Threads." Prentice Hall, 1996 ISBN: 0-13-172389-8.
Ahmad, I. et al.: "Video compression with parallel processing" Parallel Computing, Elsevier Publishers, Amsterdam. NL. vol. 28, No. 7-8, Aug. 2002, pp. 1039-1078, XP004375033.
Bhatia, T..: "Optimization of H.264 High Profile Decoder for Pentium 4 Processor" M. SC Thesis, Online, Dec. 2005, pp. I-X11-1-81, XP002454824.

(Continued)

Primary Examiner — Dac Ha
Assistant Examiner — James M Perez
(74) Attorney, Agent, or Firm — John G. Rickenbrode

(57) ABSTRACT

A video stream (for example, H.264 video) includes intra-encoded portions. Decoding an intra-encoded portion utilizes the result of decoding one or more other portions (called predecessors) in the frame. Frame reconstruction involves identifying a portion that has no predecessor portions that have not been decoded and then initiating decoding of the identified portion(s). When the decoding of a portion is substantially complete, then the remaining portions to be decoded are examined to identify portions that have no predecessors that have not been decoded. By carrying out this method, multiple portions may be decoded simultaneously. Each can be decoded on a different work entity, thereby increasing the rate of decoding of the overall frame. Because deblock filtering a predecessor destroys information needed in the intra-decoding of other portions, prefiltered predecessor information is stored in a buffer for subsequent use during intra-decoding, thereby facilitating simultaneous decoding of multiple portions.

41 Claims, 9 Drawing Sheets

OTHER PUBLICATIONS

Bilas, A. et al.: "Real-Time Parallel MPEG-2 Decoding in Software" Parallel Processing Symposium, 1997. Proceedings., ILTH International Geneva, Switzerland Apr. 1-5, 1997, pp. 197-203, XP010216782.

Chen-Han, T. et al.: "Algorithm and Architecture Optimization for Full-mode Encoding of H.264/AVC Intra Prediction" Circuits and Systems, 2005. 48th Midwest symposium on Cincinnati, Ohio Aug. 7-10, 2005, Piscataway, NJ, USA, IEEE, Aug. 7, 2005, pp. 47-50 XP010893524.

De With, P.H.N. et al.: "On the Design of Multimedia Software and Future System Architectures" Proceedings of the SPIE conference on embedded processors for multimedia and communications, San Jose, CA, USA Jan. 19-20, 2004, vol. 5309, No. 1, pp. 58-69, XP002454823.

International Search Report—PCT/US07/061076, International Search Authority—European Patent Office—Oct. 25, 2007.

Jamil-Ur-Rehman, et al.: "Fast Intra Prediction Mode Decision Using Parallel Processing" Proceedings of 2005 International Conference on Machine and Cybernetics, Guangzhou, China, Aug. 18-21, 2005, Piscataway, NJ, USA, IEEE, Aug. 18, 2005, pp. 5094-5098, XP010847681.

Li, E. et al.: "Implementation of H.264 Encoder on General-Purpose Processors with Hyper-Threading Technology" Proceedings of the SPIE Conference on Visual Communications and Image Processing 2004, San Jose, CA, USA, Jan. 20-22, 2004, vol. 5308, No. 1, pp. 384-395, XP002454822.

Tol Van Der E B et al: "Mapping of H.264 Decoding on a multiprocessor architecture" Proceedings of the SPIE Conference on Image and Video communications and processing 2003, Santa Clara, CA, USA, Jan. 21-24, 2003, pp. 707-718, XP008025096.

Written Opinion of the International Searching Authority—PCT/US07/061076, European Patent Office—Jul. 25, 2008.

* cited by examiner

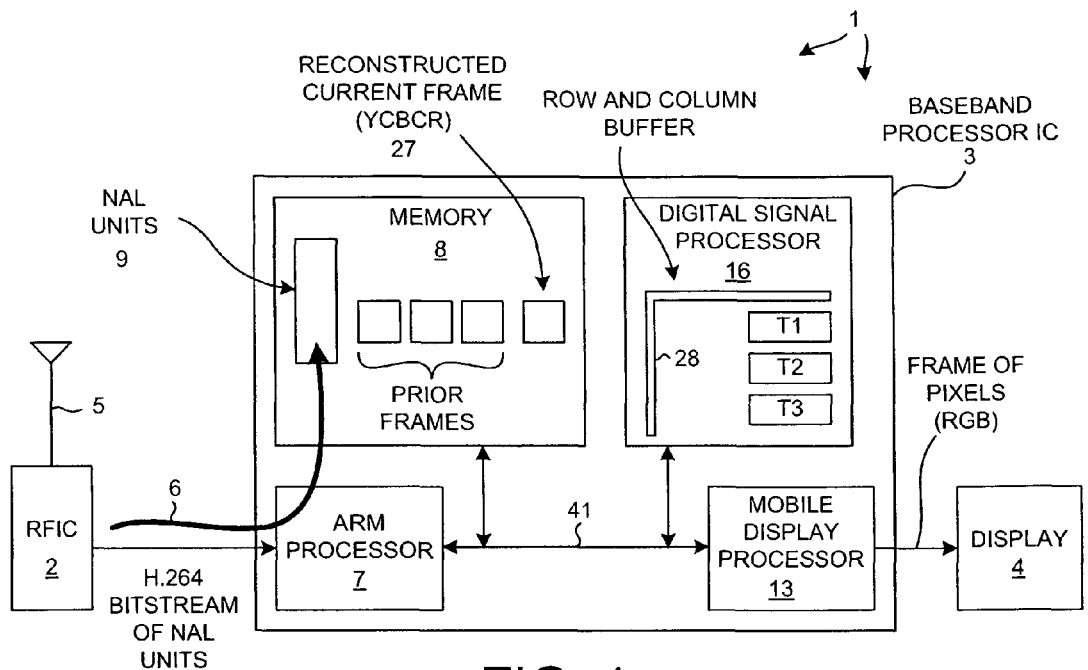
FIG. 1
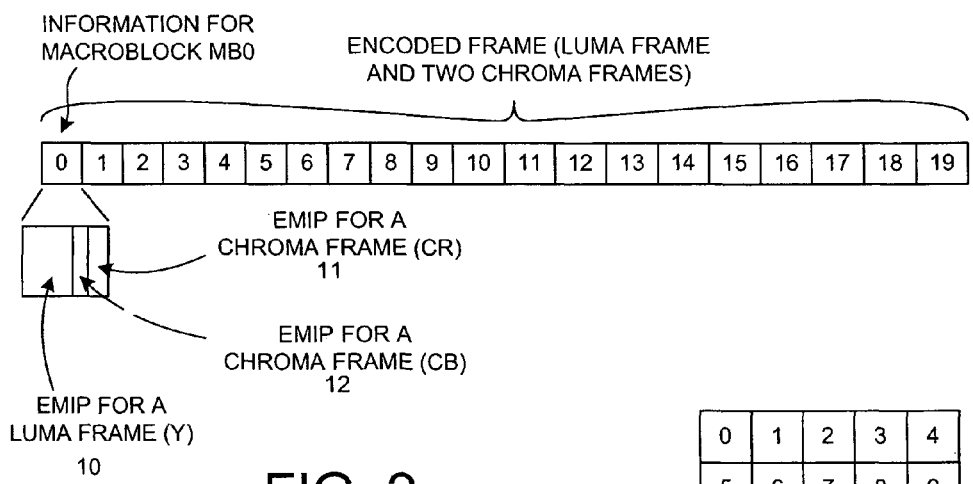
FIG. 2
| 0 | 1 | 2 | 3 | 4 |
|---|---|---|---|---|
| 5 | 6 | 7 | 8 | 9 |
| 10 | 11 | 12 | 13 | 14 |
| 15 | 16 | 17 | 18 | 19 |
MACROBLOCKS IN A FRAME
(LUMA)
FIG. 3

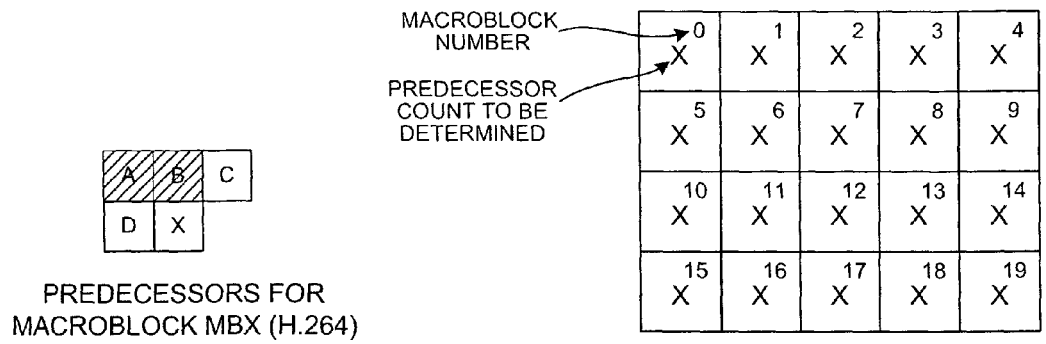
PREDECESSORS FOR
MACROBLOCK MBX (H.264)
FIG. 6
FIG. 7
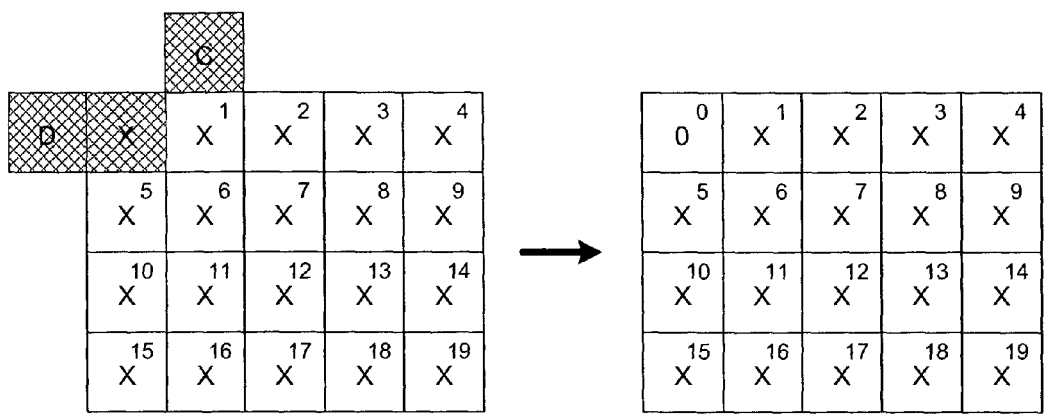
FIG. 8
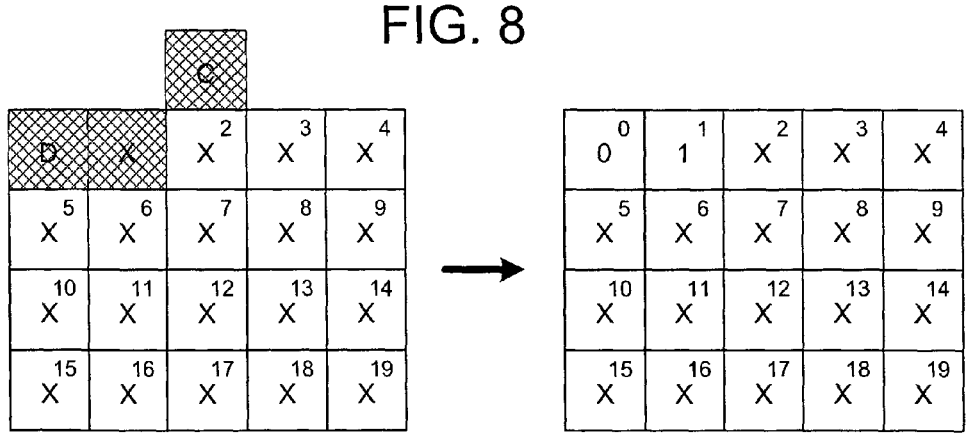
FIG. 9

PREDECESSOR TABLE

|   |   |   |   |   |
|---|---|---|---|---|
| 0<br>0 | 1<br>1 | 2<br>1 | 3<br>1 | 4<br>1 |
| 5<br>1 | 6<br>2 | 7<br>2 | 8<br>2 | 9<br>2 |
| 10<br>1 | 11<br>2 | 12<br>2 | 13<br>2 | 14<br>2 |
| 15<br>1 | 16<br>2 | 17<br>2 | 18<br>2 | 19<br>2 |

T1 DECODES MB0

FIG. 12

|   |   |   |   |   |
|---|---|---|---|---|
| 0<br>0 | 1<br>0 | 2<br>1 | 3<br>1 | 4<br>1 |
| 5<br>1 | 6<br>2 | 7<br>2 | 8<br>2 | 9<br>2 |
| 10<br>1 | 11<br>2 | 12<br>2 | 13<br>2 | 14<br>2 |
| 15<br>1 | 16<br>2 | 17<br>2 | 18<br>2 | 19<br>2 |

MB0 DECREMENTS MB1.
T1 DECODES MB1.

FIG. 13

|   |   |   |   |   |
|---|---|---|---|---|
| 0<br>0 | 1<br>0 | 2<br>0 | 3<br>1 | 4<br>1 |
| 5<br>0 | 6<br>2 | 7<br>2 | 8<br>2 | 9<br>2 |
| 10<br>1 | 11<br>2 | 12<br>2 | 13<br>2 | 14<br>2 |
| 15<br>1 | 16<br>2 | 17<br>2 | 18<br>2 | 19<br>2 |

MB1 DECREMENTS MB2 AND MB5.
T1 DECODES MB2.
T2 DECODES MB5.

FIG. 14

|   |   |   |   |   |
|---|---|---|---|---|
| 0<br>0 | 1<br>0 | 2<br>0 | 3<br>0 | 4<br>1 |
| 5<br>0 | 6<br>0 | 7<br>2 | 8<br>2 | 9<br>2 |
| 10<br>1 | 11<br>2 | 12<br>2 | 13<br>2 | 14<br>2 |
| 15<br>1 | 16<br>2 | 17<br>2 | 18<br>2 | 19<br>2 |

MB 2 DECREMENTS MB3, MB6.
MB5 DECREMENTS MB6.
T1 DECODES MB3.
T2 DECODES MB6.

FIG. 15

MB3 DECREMENTS MB4 AND MB7.
MB6 DECREMENTS MB7 AND MB10.
T1 DECODES MB4.
T2 DECODES MB7.
T3 DECODES MB10.

FIG. 16

MB4 DECREMENTS MB8 AND MB9.
MB7 DECREMENTS MB8 AND MB11.
MB10 DECREMENTS MB11.
T1 DECODES MB8.
T2 DECODES MB11.

FIG. 17

MB8 DECREMENTS MB9 AND MB12.
MB11 DECREMENTS MB12 AND MB15.
T1 DECODES MB9.
T2 DECODES MB12.
T3 DECODES MB15.

FIG. 18

MB9 DECREMENTS MB13 AND MB14.
MB12 DECREMENTS MB13 AND MB16.
MB15 DECREMENTS MB16.
T1 DECODES MB13.
T2 DECODES MB16.

FIG. 19

MB13 DECREMENTS MB14 AND MB17.
MB16 DECREMENTS MB17.
T1 DECODES MB14.
T2 DECODES MB17.

FIG. 20

MB14 DECREMENTS MB18 AND MB19.
MB17 DECREMENTS MB18.
T1 DECODES MB18.

FIG. 21

MB18 DECREMENTS MB19.
T1 DECODES MB19.

FIG. 22

DONE

FIG. 23

PREFILTERED RECONSTRUCTED VALUES
THAT MAY BE REQUIRED TO INTRA-DECODE
MACROBLOCK X

PREDECESSORS FOR
MACROBLOCK MBX (MPEG4)

PARALLEL DECODING OF INTRA-ENCODED VIDEO

BACKGROUND

1. Field

The disclosed embodiments relate to video decoding.

2. Background Information

Cellular telephones provide their users more functionality than just an ability to make and receive wireless telephone calls. Cellular telephone manufacturers are incorporating more and more functionality into their cellular telephones in order to compete for user interest with other cellular telephone manufacturers. A cellular telephone manufacturer may, for example, build a video receiving capability into their cellular telephones. The cellular telephone is to be usable to receive a stream of compressed video information transmitted from a satellite, to decode the compressed information into video, and to display the video on the display of the cellular telephone. The cellular telephone user may therefore watch satellite television programming on the display of the cellular telephone. The manufacturer, however, also wants the cellular telephone to be inexpensive to manufacture. In one example, an older semiconductor processing technology is to be used to realize digital processing circuitry of the cellular telephone in order to reduce the cost of the integrated circuits making up the cellular telephone. Using the older processing technology is less expensive than using a higher speed, newer processing technology.

In one example, the older processing technology limits the clock speed of a digital signal processor that can be realized to about one hundred megahertz. It is desired to be able to use this older technology to video decode thirty frames per second of VGA (640×480 pixels) compressed video information, and to display the resulting VGA resolution video in real time on the display of the cellular telephone. Unfortunately, a one hundred megahertz digital signal processor does not have adequate throughput to carry out the required amount of processing. A digital signal processor having a clock frequency of 250 to 300 megahertz would be required to decode the VGA video stream at thirty frames per second. Accordingly, if the inexpensive semiconductor processing technology is used, then it may only be possible for the cellular telephone to display one third the desired resolution images at the desired thirty frames per second frame rate.

There also may be reasons other than cost for limiting the frequency of clock signal that clocks the digital signal processing circuitry within a cellular telephone.

SUMMARY INFORMATION

A solution is desired that allows the limited clock rate to be used without limiting the resolution of the video that can be decoded and viewed on the cellular telephone.

An amount of encoded video (for example, H.264 video or MPEG4 video) includes a sequence of encoded portions. Each encoded portion contains information on how to reconstruct a corresponding macroblock of pixels in a frame of the video. Some portions are intra-encoded. The decoding of an intra-encoded portion utilizes the result of the decoding one or more other portions. The other portions may be called "predecessors." Reconstruction of the overall frame of video involves identifying a portion that has no predecessor portions that have not been decoded. A table called a "predecessor table" may be used in this identification. The decoding of each such identified portion is then initiated. When the decoding of a portion is substantially complete (reconstructed at least up to the point of deblocking), then the remaining portions to be decoded are examined to identify portions that have no predecessors that have not been decoded. Again, the decoding of each such identified portion is then initiated. This process of identifying portions that have no undecoded predecessors and then initiating decoding of those identified portions is repeated until all portions of the frame have been decoded.

By carrying out this method, the decoding of portions is initiated such that multiple portions are decoded simultaneously. Each such portion can be decoded on a different work entity, thereby increasing the rate of decoding of the overall frame as compared to a decoding method where only one portion can be decoded at a time. Because deblock filtering of a reconstructed predecessor macroblock can destroy information (reconstructed but prefiltered information) needed in the intra-decoding of other dependent portions, prefiltered predecessor information is stored in a buffer for subsequent use during intra-decoding of dependent portions, thereby facilitating the simultaneous decoding of multiple portions.

In one embodiment, the amount of encoded video is received as a Network Abstraction Layer (NAL) unit bitstream onto a cellular telephone. A set of parallel digital signal processors in the baseband processor integrated circuit within the cellular telephone decodes the bitstream in real time. The baseband processor integrated circuit therefore includes a video CODEC (enCOder/DECoder) functionality. After the method identifies portions that can be decoded simultaneously, the identified portions are decoded in parallel by the various parallel digital signal processors. By distributing the workload over multiple digital signal processors, higher resolution frames of video can be rendered at an adequately high frame rate without having to increase the maximum processor clock rate of the digital signal processors within the baseband processor integrated circuit. The resulting high resolution frames of video are output from the baseband processor integrated circuit and are rendered on the display of the cellular telephone for viewing. In one example, an H.264 video stream of color VGA frames (640×480 pixels) is received onto a cellular telephone and is decoded in real time at a frame rate of thirty frames per second using a set of parallel digital signal processors, where each of the digital signal processors has a maximum clock rate of one hundred megahertz.

Additional methods and structures are described in the detailed description below. This summary does not purport to define the invention. The invention is defined by the claims.

BRIEF DESCRIPTION OF THE DRAWINGS

FIG. 1 is a block diagram of a mobile communication device in accordance with one novel aspect.

FIG. 2 is a simplified diagram of a stream of video received onto the mobile communication device of FIG. 1.

FIG. 3 illustrates one frame that is to be reconstructed from the stream of video of FIG. 2.

FIG. 6 illustrates a predecessor macroblock relationship that is due to the H.264 standard.

FIG. 7 is a diagram of a frame of macroblocks. There is an Encoded Macroblock Information Portion (EMIP) in the stream of video of FIG. 2 for each macroblock in the frame of FIG. 7.

FIGS. 8-10 illustrate steps in generating a predecessor table.

FIG. 11 is a diagram of the predecessor table that results from carrying out the steps of FIGS. 8-10.

FIGS. 12-23 illustrate the results of carrying out the steps of the method of FIG. 5 in order to reconstruct the frame of video that was communicated to the mobile communication device of FIG. 1 as the stream of FIG. 2.

DETAILED DESCRIPTION

Figure 4:
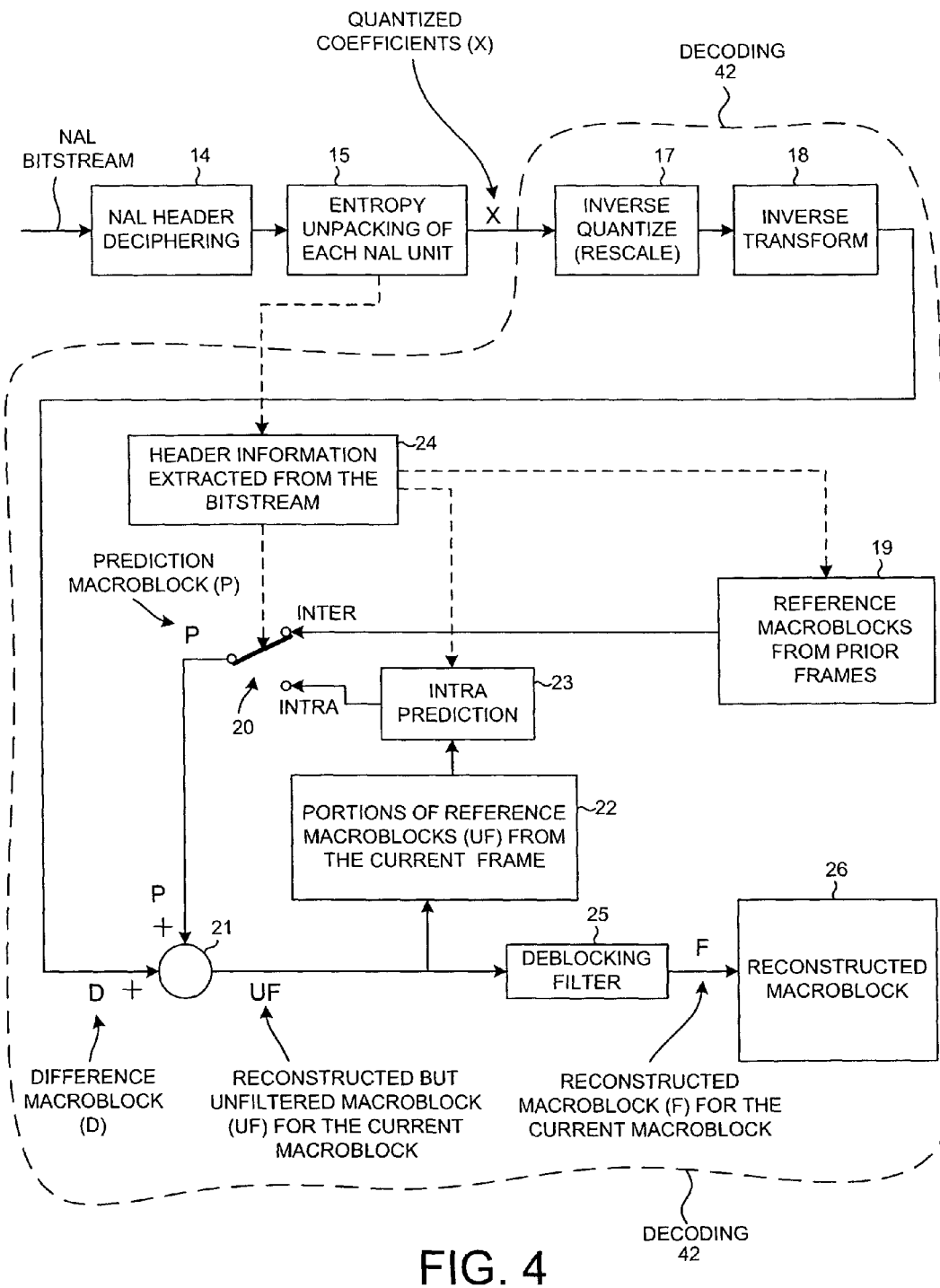
FIG. 4 is a simplified diagram that illustrates how the frame of FIG. 3 can be reconstructed in accordance with the H.264 standard.

FIG. 1 is a block diagram of a mobile communication device 1. Mobile communication device 1 in this example is a cellular telephone that includes a Radio Frequency Integrated Circuit (RFIC) 2, a baseband processor integrated circuit (BPIC) 3, and a display 4. RFIC 2 includes an analog circuit for receiving RF cellular telephone signals from an antenna 5, processing and converting the signals into digital form, and communicating the resulting digital information to BPIC 3. RFIC 2 also includes circuitry for receiving digital information from BPIC 3, for processing and converting the digital information into analog form, and for transmitting the information as RF signals from antenna 5. In addition to supporting cellular telephone communication, BPIC 3 also serves as a hardware platform for running various application layer programs. One such application in the present example is a video decoding application. BPIC 3 includes a video CODEC (enCOder/DECoder) functionality. A stream of video information in H.264 format is transmitted from a satellite. The video RF signal is received by RFIC 2 and is communicated in the form of a bitstream 6 of H.264 Network Abstraction Layer (NAL) units to BPIC 3. Bitstream 6 is sectioned up and communicated to BPIC 3 in accordance with a protocol. An ARM processor portion 7 of the BPIC 3 reassembles the bitstream 6 in accordance with the protocol and places bitstream 6 in the form of NAL units 9 into a memory 8.

FIG. 2 is a simplified diagram of the bitstream 6 of video information. In the simplified example illustrated here, bitstream 6 includes a sequence of twenty macroblock information portions. These macroblock information portions are labeled 0 through 19 in FIG. 2. Each portion includes three subportions, referred to here as "encoded macroblock information portions" (EMIPs). Consider, for example, macroblock information portion MB0 in the bitstream 7. This portion MB0 includes a first EMIP 10 that indicates how to reconstruct Y luminance information for macroblock MB0, a second EMIP 11 that indicates how to reconstruct Cr chroma information for the macroblock MB0, and a third EMIP 12 that indicates how to reconstruct Cb choma information for the macroblock MB0. A macroblock in this specific example is a sixteen by sixteen block of pixel information.

A frame of pixel information, where each pixel includes luminance and chrominance information, can be organized into three frames (also called fields), one for Y luminance, one for Cr chrominance, and one for Cb chrominance. When the frame is to be rendered on display 4, the corresponding luminance and chrominance values from the three frames are combined, and converted in the Red-Green-Blue (RGB) color space. The YCrCb to RGB conversion is performed by a Mobile Display Processor (MDP) portion 13 of the BPIC 3. The RGB pixel information is supplied to display 4 for rendering.

FIG. 3 illustrates the luminance frame. EMIP 10 of portion MB0 of FIG. 2 contains information for how to reconstruct the luminance information for macroblock MB0 in the frame of FIG. 3; the EMIP for luminance information in portion MB1 of FIG. 2 contains information for how to reconstruct the luminance information for macroblock MB1 of FIG. 3; and so forth.

FIG. 4 is a simplified diagram that illustrates how the frame of FIG. 3 can be reconstructed in accordance with the H.264 standard. Simplified terminology is employed to facilitate explanation of the process depicted in FIG. 4. For additional detail on how to process a NAL unit bitstream and how to reconstruct a frame of video information, see the H.264 standard (for example, see: ITU-T Video Coding Experts Group (VCEG), Recommendation H.264/ISO/IEC 14496-10, "Advanced Video Coding," 2003). The description below corresponding to FIG. 4 is simplified for illustrative purposes in that it represents a single-threaded implementation of an H.264/AVC compliant decoder.

ARM processor portion 7 retrieves the NAL units 9 from memory 8. The NAL units 9 include headers and other information. What each NAL header means is specified by the H.264 standard. The NAL headers are deciphered as indicated by block 14, and entropy unpacking is performed on the remaining information as indicated by block 15. The remaining information includes symbols. Each symbol is looked up in a table to identify a corresponding string of bits. The resulting strings of bits that correspond to the symbols are concatenated to form a stream of quantized coefficients (X). The processing of blocks 14 and 15 are both performed by ARM processor 7, and the resulting stream of quantized coefficients and deciphered header information is written back into memory 8. ARM processor 7 may be clocked at approximately one gigahertz in this example.

It is recognized that the NAL header deciphering of block 14 may be referred to in the art as "NAL header decoding" and that the entropy unpacking of block 15 may be referred to in the art as "entropy decoding." The processing of blocks 14 and 15 is not, however, referred to here as decoding. Rather, the term "decoding" is used here to describe other processing including inverse transforming, inter-decoding, intra-decoding (see dashed line 42 in FIG. 4).

A digital signal processor (DSP) portion 16 of the baseband processor integrated circuit 3 retrieves the quantized coefficients (X) and rescales the coefficients in accordance with the H.264 standard. This rescaling reverses a scaling that was performed during H.264 encoding of the frame. This rescaling is illustrated by block 17 of FIG. 4. (Both DSP portion 16 and ARM processor portion 7 can read from and write to memory 8. Memory 8 is a processor-readable medium. Both ARM processor portion 7 and DSP portion 16 execute separate sets of instructions that are stored in other processor-readable media (not shown) that are parts of ARM processor portion 7 and DSP portion 16, respectively.)

DSP portion 16 then inverse transforms the rescaled coefficients as specified in the H.264 standard. This inverse transform reverses a transform performed during H.264 encoding of the frame. Application of the inverse transform is illustrated by block 18 of FIG. 4. The result is pixels of difference information (D). The difference pixel values are ordered such that difference pixel values for a first macroblock are output, and then difference pixel values for a second macroblock are output, and so forth in macroblock scan line order.

The macroblock of difference pixel information (D) could have been either inter-encoded or intra-encoded. "Inter-encoded" in the example of FIG. 4 means the macroblock is encoded based at least in part on pixel information from another block in another frame (not the frame currently being reconstructed). For example, the difference pixel information (D) may have been inter-encoded by subtracting a macroblock being encoded from the corresponding macroblock in the prior frame (the frame in the video information that precedes the frame being reconstructed). This difference pixel information was then transformed, quantized, scaled, packed, and entropy packed to form an inter-encoded EMIP.

"Intra-encoded" means that the macroblock is encoded based at least in part on pixel information from another block in the current frame. For example, the difference pixel information (D) may have been intra-encoded by subtracting pixel information of a macroblock being encoded from pixel information along an edge of a neighboring macroblock in the same frame. This difference pixel information was then transformed, quantized, scaled, packed and entropy packed to form an intra-encoded EMIP. For additional detail, see the H.264 standard.

For example, if the current EMIP being decoded was an inter-encoded EMIP, then block 19 causes appropriate pixels from a prior frame to be supplied (symbolized in FIG. 4 by switch symbol 20) to a summer (symbolized in FIG. 4 by summing node symbol 21). The supplied pixels from a macroblock are called the prediction macroblock (P). The difference macroblock (D) pixel values are added to the macroblock P pixel values to generate a reconstructed (but unfiltered) macroblock (UF) of pixel values. On the other hand, if the current EMIP being decoded was an intra-encoded EMIP, then blocks 22 and 23 cause a portion of a previously decoded macroblock of the current frame to be supplied (symbolized in FIG. 4 by switch symbol 20) to the summer 21. The portion of the supplied macroblock is called the prediction macroblock (P). Each pixel value of difference macroblock D is added to a pixel value from macroblock P to generate a pixel value of a reconstructed (but unfiltered) macroblock (UF). In this intra-decoding, note that the portion of the prediction macroblock (P) is not a portion of a filtered macroblock taken from the output of a deblocking filter block 25, but rather is a portion of a prefiltered macroblock taken from the output of summer 21. There are multiple ways that the portion of the prediction macroblock (P) is used to generate a reconstructed macroblock from an intra-encoded EMIP. For details on these multiple ways, see the H.264 standard.

Whether the current EMIP being decoded was inter-encoded or intra-encoded is determined by header information in the bitstream. Block 24 of FIG. 4 uses this header information to control whether inter or intra-decoding is employed. Block 24 is therefore illustrated as controlling the position of switch symbol 20.

A frame of such reconstructed macroblocks may exhibit blockiness and discontinuities between the various macroblocks of the frame. In accordance with H.264, the boundaries between neighboring reconstructed macroblocks are filtered to help reduce the blockiness. This filtering is sometimes called "deblocking filtering" and is represented in FIG. 4 by block 25. Deblocking filter 25 outputs the reconstructed and filtered current macroblock (F) 26. Macroblock (F) 26 is stored in memory 8 along with other similarly reconstructed macroblocks in the same frame such that an entire frame 27 of reconstructed macroblocks is generated. Reconstructed frame 27 is stored in memory 8 in FIG. 1. As explained above, mobile display processor 13 retrieves the frame 27, converts it into RGB format, and supplies the frame of RGB pixels to display 4 for rendering. When the decoding of NAL units further into the bitstream 6 corresponding to a next frame begins, the just completed reconstructed and filtered frame 27 is made available for use in decoding an inter-encoded EMIP. The storage of such prior reconstructed and filtered frames is illustrated in FIG. 4 by block 19. In the presently described embodiment, the H.264 bitstream is decoded at a rate of thirty VGA (640×480 pixels) frames per second using a BPIC 3. BPIC 3 has one ARM processor 7 (one gigahertz maximum clock rate) and a DSP 16 involving six parallel DSP processors (each DSP processor has a maximum clock rate of 100 MHz).

Figure 5:
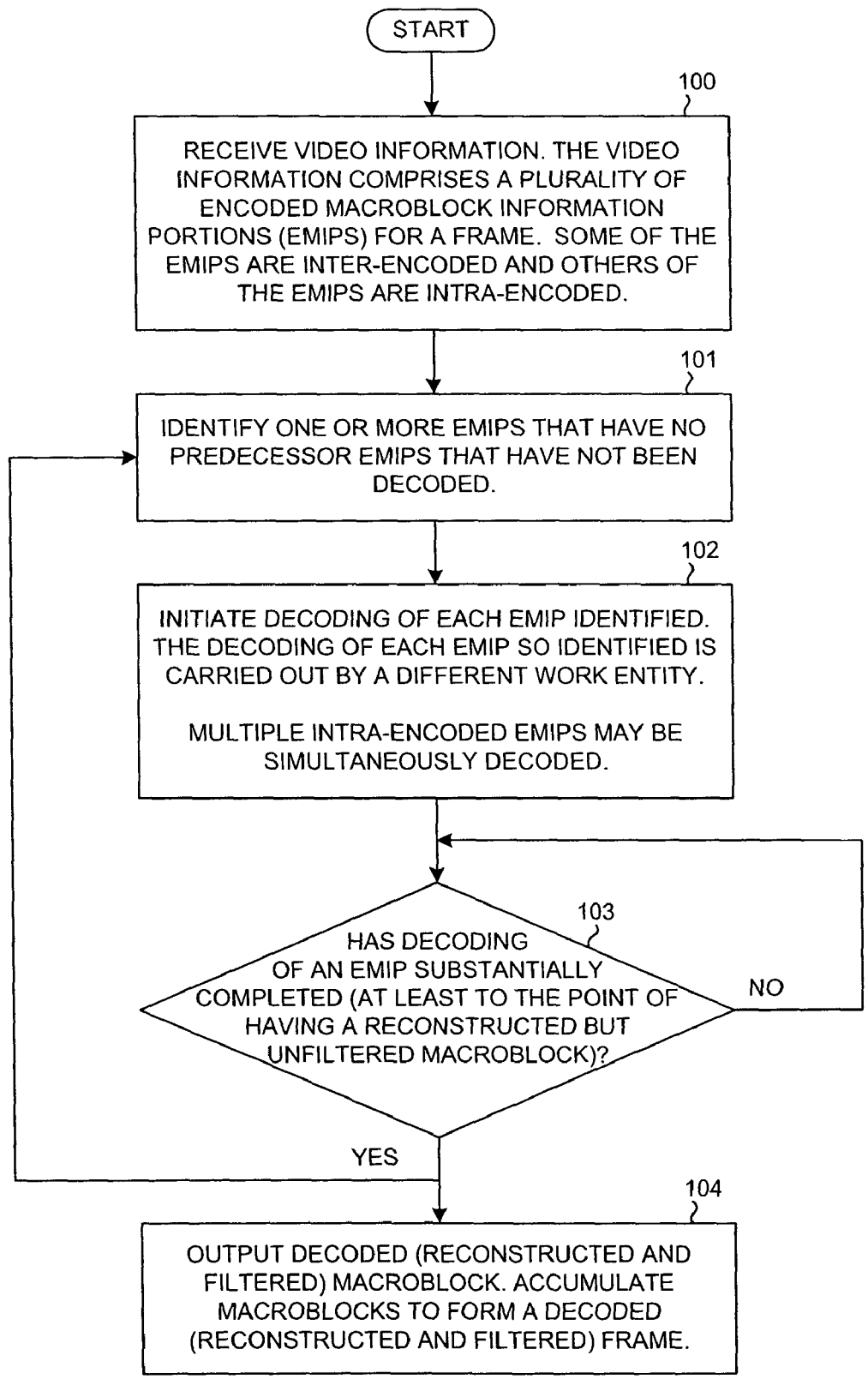
FIG. 5 is a flowchart that illustrates a novel method carried out by the mobile communication device of FIG. 1.

FIG. 5 is a flowchart diagram that illustrates a novel method that allows the one hundred megahertz DSP processors to decode a H.264 bitstream of NAL units into VGA frames at the thirty frames per second rate. The method of FIG. 5 involves what may be called a "predecessor table." How the predecessor table is derived is explained below. After the explanation of the predecessor table, then the steps in the method of FIG. 5 are explained.

FIG. 6 illustrates a set of five macroblocks A, B, C, D and X. Macroblock X is the current macroblock to be decoded. Due to the use of intra-encoding and deblocking in H.264, the decoding of macroblock X may require the result of decoding macroblocks C and D. The decoding of macroblock X cannot therefore be performed until macroblocks C and D have been substantially decoded (rescaled, inverse transformed, and reconstructed at least up to the point of deblocking). This is so because if macroblock X is intra-encoded, then its decoding would require that block 22 in FIG. 4 contain reconstructed (but not filtered) macroblocks C and D. Accordingly, macroblocks C and D are said to be "predecessor" macroblocks for macroblock X. This relationship, which depends on the details of the type of intra-encoding and deblocking employed, is used to generate the predecessor table.

FIG. 7 is a diagram of a frame of macroblocks. The number in the upper right corner of each macroblock is the macroblock number. The number in the center of each macroblock is a predecessor count value for the macroblock. Initially, all predecessor count values in the table are unknown and therefore are represented in FIG. 7 as "X's."

In a first step, the macroblock structure of FIG. 6 is placed with respect to the frame of FIG. 7 so that macroblock X of the macroblock structure of FIG. 6 is disposed over macroblock MB0 of FIG. 7. This is illustrated in the left portion of FIG. 8. The darkened macroblocks represent the macroblocks of the macroblock structure of FIG. 6. Because macroblocks C and D are outside the boundaries of the frame as indicated by FIG. 8, macroblock X can be decoded without waiting for the decoding of any other macroblock. Macroblock MB0 is therefore said to have no predecessors. As illustrated in the right portion of FIG. 8, a zero (representing that MB0 has no predecessors) is the predecessor count value for MB0.

Next, the macroblock structure of FIG. 6 is shifted to the right so that macroblock X of the macroblock structure of FIG. 6 is disposed over macroblock MB1. This is illustrated in the left portion of FIG. 9. Macroblock C is still outside the boundaries of the frame, but macroblock D is now over MB0. Accordingly, macroblock MB0 must be decoded before macroblock MB1 can be decoded. MB1 is therefore said to have one predecessor macroblock (MB0). A one (representing that MB1 has one predecessor) is the predecessor count value for MB1 as illustrated in the right portion of FIG. 9.

Next, the macroblock structure of FIG. 6 is shifted to the right so that macroblock X of the macroblock structure of FIG. 6 is disposed over macroblock MB2. This is illustrated in the left portion of FIG. 10. Macroblock C is still outside the boundaries of the frame, but macroblock D is now over MB1. Accordingly, macroblock MB1 must be decoded before macroblock MB2 can be decoded. MB2 is therefore said to have one predecessor macroblock (MB1). A one (representing that MB2 has one predecessor) is the predecessor count value for MB2 as illustrated in the right portion of FIG. 10.

This process of shifting the macroblock structure of FIG. 6 across the macroblocks of the frame of FIG. 7 is repeated in scan line order, left to right, row by row down the various rows of the frame until each predecessor count value in the predecessor table is filled in.

Figures 10, 11:
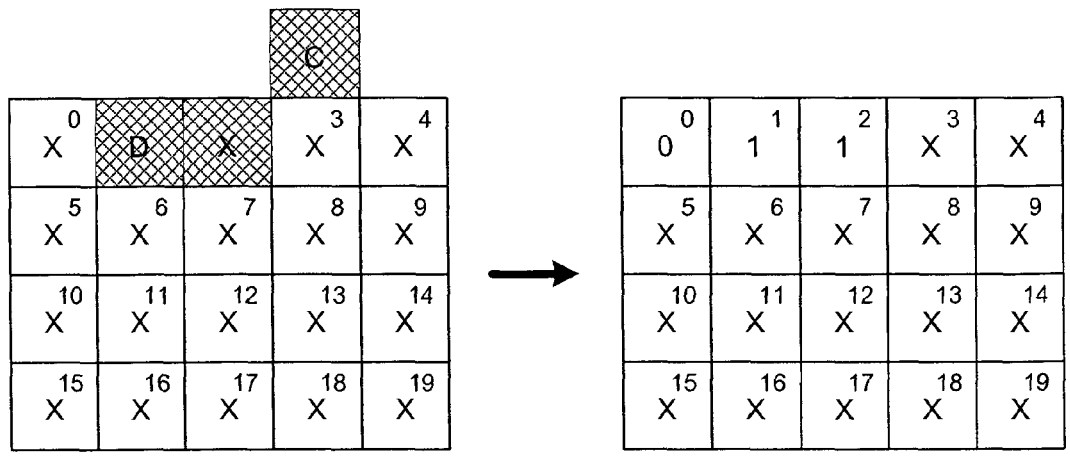

FIG. 11 illustrates the resulting predecessor table. This table is used in the method of FIG. 5. Initially, in the method of FIG. 5, video information is received (step 100 in FIG. 5). The video information includes a plurality of EMIPs for a frame. Some EMIPs are inter-encoded, and other EMIPs are intra-encoded. The video information may, for example, be bitstream 6 of FIG. 1.

Next (step 101), one or more EMIPs are identified that have no predecessor EMIPs that have not been decoded. In one example, a control entity process executing on DSP 16 retrieves the predecessor table of FIG. 11 from memory 8. The zero predecessor count value for MB0 indicates that the EMIP for MB0 is an EMIP that has no predecessor EMIPs that have not yet been decoded.

Next (step 102), decoding of the EMIPs identified in step 101 is initiated. The decoding of each of these EMIPs is carried out by a different working entity. In one example, DSP 16 includes six parallel DSP processors. Each DSP processor is clocked at a one hundred megahertz rate. A pipelined architecture is employed with interleaved one hundred megahertz clock signals clocking each respective DSP processor. From the perspective of software executing on DSP 16, there appear to be six separate DSP processors available for the execution of code. Each DSP processor executes a separate thread of instructions and is considered to be a different work entity. All threads receive work to do from a separate queue.

In the presently described example, only one EMIP was identified in step 101 and this is the EMIP for MB0. This EMIP for MB0 is placed on the shared queue. The first thread (denoted T1 in FIG. 1) picks it up for decoding on the first virtual DSP processor and decodes the EMIP for MB0 in accordance with the methodology of FIG. 4.

FIG. 12 illustrates this stage in processing. This state persists as long as the decoding of no EMIP is substantially complete (substantially complete means decoding is complete to the point of obtaining the reconstructed but unfiltered macroblock (UF)). When it is determined that the decoding of an EMIP has been substantially completed (step 103), then process flow returns to step 101. In the diagrams of FIGS. 12-23, a macroblock whose EMIP has been substantially decoded is represented as a block filled with cross-hatching. From step 103, decoding also continues such that the reconstructed macroblock (UF) is deblock filtered to generate a reconstructed and filtered macroblock. The resulting reconstructed and filtered macroblock is output (step 104) and is accumulated to begin the formation of a reconstructed and filtered frame.

In the presently described example, once the decoding of macroblock MB0 is substantially complete, the identification of one or more EMIPs that have no predecessor EMIPs (step 101) is performed using the predecessor table of FIG. 12. In the predecessor table, the predecessor count values of all macroblocks for which MB0 is a predecessor are decremented by one. They are decremented by one because one of their predecessors (MB0) has now been adequately decoded. In the presently described example, MB0 is a predecessor for MB1. As indicated by FIG. 13, the predecessor count value of MB1 is decremented from one to zero. Any macroblock for which its predecessor count value is zero does not have any predecessors. Accordingly, MB1 is identified in step 101 as being an EMIP that has no predecessor EMIPs that have not been decoded.

Next (step 102), the decoding of the EMIP for MB1 is initiated. In the present example, the EMIP for MB1 is placed onto the shared queue. Because thread T1 is now idle, thread T1 can retrieve the EMIP for MB1 from the queue and start decoding it. When the decoding for the EMIP for MB1 has been substantially completed (step 103), then processing returns to step 101. Decoding also continues such that the reconstructed macroblock (UF) for MB1 is deblock filtered to generate a reconstructed and filtered macroblock for MB1.

When the decoding for the EMIP for MB1 causes processing to return to step 101, the predecessor count values of all macroblocks for which MB1 is a predecessor are decremented. As illustrated in FIG. 14, this results in the predecessor count values of macroblocks MB2 and MB5 being decremented. Note that the macroblock dependency structure of FIG. 6 indicates that MB1 is a predecessor for both MB2 and for MB5. The decrementing results in the predecessor count values for macroblocks MB2 and MB5 changing from ones to zeros. The EMIPs for MB2 and MB5 are therefore identified in step 101 as being EMIPs that have no predecessor EMIPs that have not been decoded.

In the presently described example, EMIPs for MB2 and MB5 are pushed onto the shared work queue as the last step of processing for the prior MBs. DSP thread T1 pops the EMP for MB2 from the queue, and thread T2 pops the EMIP for MB5 from the queue. This is the state of processing illustrated in FIG. 15. At this point, not just one, but two EMIPs are being simultaneously decoded using multiple different work entities (in this case, two threads).

When one of these EMIPs is substantially decoded, then processing proceeds from decision step 103 back to step 101. In the presently described simplified example, the decoding of all EMIPs takes the same amount of time. The EMIP for MB2 and the EMIP for MB5 therefore are both determined to be substantially decoded in step 103 at the same time. Substantially decoded MB2 is a predecessor for both MB3 and for MB6. Accordingly, step 101 involves decrementing the predecessor count values for MB3 and MB6. Also, substantially decoded MB5 is a predecessor for MB6. Accordingly, step 101 involves decrementing the predecessor count value for MB3 once and involves decrementing the predecessor count value for MB6 twice. As illustrated in FIG. 16, the predecessor count values for MB3 and MB6 are reduced to zeros. Due to their predecessor count values being zeros, the EMIPs for MB3 and MB6 are identified (step 101) as being EMPS that have no predecessor EMIPs that have not been decoded. Decoding of the identified EMIPs (step 102) is initiated. As illustrated in FIG. 16, EMIPs for MB3 and MB6 are pushed onto the shared queue. Thread T1 pops the EMIP for MB3 from the queue and thread T2 pops the EMIP for MB6 from the queue. The EMIPs for MB3 and MB6 are thereafter decoded simultaneously by different work entities (in this case, different threads).

Processing proceeds in this manner across the macroblocks of the frame. Processing of the EMIPs in the presently described example is set forth by the sequence of diagrams of FIGS. 16-23. Note that the method carried out by the control entity (a process executing on DSP 16) causes three EMIPs to be processed at the same time at different points (see FIGS. 16 and 18) in the overall process. The three work entities (three threads of instructions T1, T2 and T3) that perform this parallel processing are illustrated in FIG. 1 as blocks within DSP 16.

Figure 24:
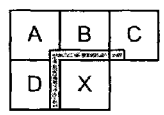
FIG. 24 illustrates a strip of reconstructed values (reconstructed but unfiltered values) that might be required in the intra-decoding of macroblock X.

BUFFER FOR PREFILTERED VALUES: The decoding of a group of EMIPs at the same time is possible because the information required to decode each EMIP in the group is not dependent on the results of decoding others of the EMIPs in the group that are to be simultaneously decoded. As indicated in FIG. 6, the decoding of an intra-encoded EMIP for macroblock X requires that the EMIP for macroblocks C and D be decoded first. More particularly, the intra-decoding of macroblock X may require the decoding results from a strip of values along the bottom edge of macroblock B and may require the decoding results from a strip of values along the right edge of macroblock D and may require the decoding results for a small block of values in the lower right corner of macroblock A. FIG. 24 illustrates this strip of values that might be required in the intra-decoding of macroblock X. In the example of H.264, this strip is one value wide and extends upward along the right edge of macroblock D, through the bottom right corner (one value) of macroblock A, and left to right across the bottom edge of macroblock B, and extends about one quarter of the way into macroblock C.

In carrying out the decoding of MB7 in the decoding flow of FIGS. 12-23 set forth above, if the EMIP for MB7 were reconstructed to generate the prefiltered macroblock values (UF), and then those prefiltered macroblock values (UF) were deblock filtered before moving on to decode the next EMIP, and if the prefiltered macroblock values (UF) were not stored, then when the EMIP for macroblock MB8 was to be decoded (see FIG. 17), the prefiltered macroblock values (UF) for the right edge of MB7 would not be available for intra-decoding of the EMIP for MB8. Similarly, when the EMIP for macroblock MB12 was to be decoded (see FIG. 18), the prefiltered macroblock values (UF) for the bottom edge of MB7 would not be available for intra-decoding of the EMIP for MB12. To provide access to these prefiltered values for the subsequent decoding of EMIPs for other macroblocks, the bottom edge strip of prefiltered values of the EMIP being decoded is stored into a buffer prior to deblocking filtering. Similarly, to provide access to these prefiltered values for the subsequent decoding of EMIPs for other macroblocks, the right edge strip of prefiltered values of the EMIP being decoded is stored into the buffer.

Figure 25:
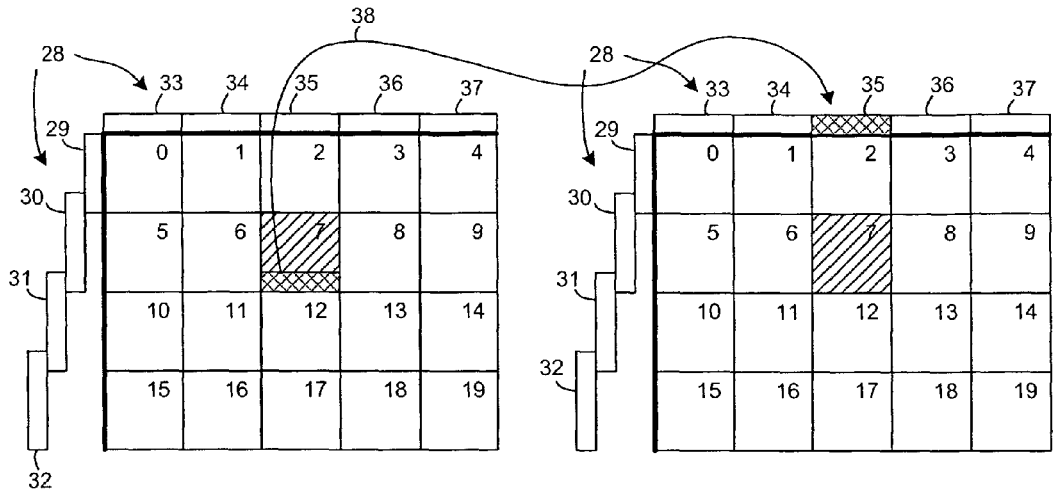
FIGS. 25 and 26 illustrate the loading of a buffer with prefiltered information for subsequent use in subsequent intra-decoding within the frame.

FIG. 25 illustrates a buffer 28 that is used to store prefiltered reconstructed values for use in decoding subsequent EMIPs in the same frame. Buffer 28 includes several vertically extending column sections 29-32 and several horizontally extending row sections 33-37. Arrow 38 illustrates that when the decoding of the EMIP for macroblock MB7 is substantially complete, the strip of prefiltered values along its bottom edge is stored in a corresponding portion 35 of buffer 28. Portion 35 is the portion of buffer 28 that corresponds to the column of macroblocks that contains macroblock MB7. These values remain in buffer 28 until the EMIP for macroblock MB12 is to be decoded. When the EMIP for macroblock MB12 is decoded, the values in portion 35 of buffer 28 may be used in intra-decoding. The precedence order of the macroblocks of the frame ensures that no EMIP for a macroblock in the column will be decoded before the EMIP for macroblock MB12. Accordingly, when an EMIP for a macroblock in a column is substantially complete, its bottom strip of prefiltered values is written into the portion of buffer 28 corresponding to that column. These stored prefiltered values are then available for use in the decoding of the macroblock EMIP immediately below in the column.

Figure 26:
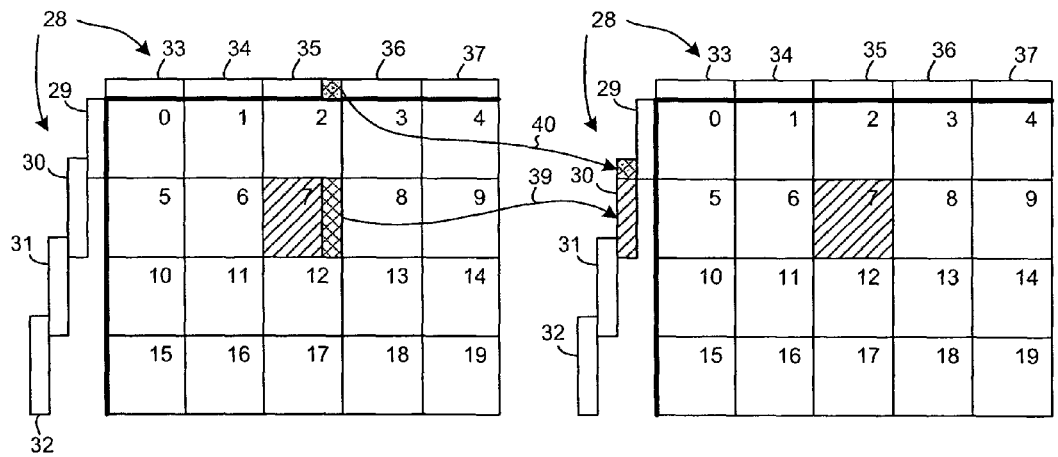

FIG. 26 illustrates that when the decoding of the EMIP for macroblock MB7 is substantially complete, the strip of prefiltered values along its right edge is stored in a corresponding portion 30 of buffer 28. Portion 30 is the portion of buffer 28 that corresponds to the row of macroblocks that contains macroblock MB7. These values remain in buffer 28 until the EMIP for macroblock MB8 is to be decoded. When the EMIP for macroblock MB8 is decoded, the values in portion 30 of buffer 28 may be used in intra-decoding. The precedence order of the macroblocks ensures that no EMIP for a macroblock in the row will be decoded before the EMIP for macroblock MB8. Accordingly, when an EMIP for a macroblock in a row is substantially complete, its right edge strip of prefiltered values is written into the portion of buffer 28 corresponding to that row. These stored prefiltered values are then available for use in the decoding of the macroblock EMIP immediately to the right in the row.

Note from FIG. 24 that a reconstructed but unfiltered value from macroblock A (lower right corner of macroblock A) may be required to intra-decode an EMIP for macroblock X. Each of the portions 30-32 therefore contains an additional value at the top of the portion. In the example of FIG. 26, when the decoding of macroblock MB7 is substantially complete, the right edge strip of prefiltered values in MB7 is written into the lower portion of 30 in buffer 28 and the prefiltered value from the right corner of portion 35 is written to the top of portion 30. The right corner of portion 35 is the result of prior processing of MB2. Then the bottom horizontal edge strip of MB7 is written to the portion 35 in buffer 28 as illustrated in FIG. 25. The intra-decoding of the EMIP for macroblock MB8 may then use the values in the top of column portion 30, as well as the other values in the bottom of column portion 30, as well as the values in the row portion 36. Portions 29-32 may be called "column" portions of buffer 28 since portions 29-32 form a column (even though each portion 29-32 corresponds to a row of macroblocks). Portions 33-37 may be called "row" portions of buffer 28 since portions 33-37 form a row (even though each portion 33-37 corresponds to a column of macroblocks). In one advantageous aspect, buffer 28 is disposed in memory within DSP 16 rather than in memory 8 in order to reduce the number of memory accesses across bus 41 that are required in order for DSP 16 to perform intra-decoding operations. Although FIG. 25 is illustrated and described before FIG. 26 in the text above, the column buffer update operations illustrated by lines 39 and 40 in FIG. 26 are performed prior to the operation described by line 38 in FIG. 25.

ENCODING ALGORITHMS OTHER THAN H.264: The method set forth above for decoding multiple EMIPs simultaneously applies to decoding EMIPs that are encoded using encoding algorithms other than H.264. The description of the decoding of H.264 EMIPs above is provided as an example. To apply the method to decode EMIPs that are encoded using another encoding algorithm, the predecessors for a block to be decoded in accordance with the encoding algorithm are determined. In one example, the relationship of these predecessors to the block to be decoded is then applied to generate a precedence table. The precedence table is then used in the decoding of the EMIPs to determine when all the predecessors for a given EMIP have been adequately decoded. When all predecessors for a given EMIP have been determined to have been adequately decoded, then the decoding of the given EMIP is initiated. The decoding of EMIPs can be initiated on different work entities such that multiple EMIPs are decoded simultaneously.

Figure 27:
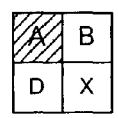
FIG. 27 illustrates a predecessor macroblock relationship for the MPEG4 encoding algorithm.

FIG. 27 illustrates a predecessor macroblock relationship for an MPEG4 encoding algorithm. In the set of four macroblocks A, B, C and X illustrated in FIG. 27, macroblock X is the current macroblock to be decoded. Macroblocks B and D are predecessors for macroblock X. In the same way that the predecessor relationship of FIG. 6 is employed to generate the predecessor table of FIG. 11 for H.264, the relationship of predecessors illustrated in FIG. 27 is employed to generate a predecessor table for MPEG4. A buffer like buffer 28 in FIGS. 25 and 26 is employed to store prefiltered and reconstructed values generated in the MPEG4 decoding of one EMIP. The stored prefiltered and reconstructed values may be used later in the intra-decoding of another EMIP in the frame. In this manner, the method set forth in this patent document for decoding multiple EMIPs simultaneously can be utilized to decode video information that was encoded using encoding algorithms other H.264 and MPEG4.

Although certain specific embodiments are described above for instructional purposes, the present invention is not limited thereto. Encoded video information need not be received onto a decoding device in the form of a stream of information, but rather may be received onto the decoding device by reading the encoded video information out of memory. The encoded video in the memory may, for example, be stored and retrieved as a file. The work entities that are capable of decoding EMIPs may be software threads such that the overall method of FIG. 5 is realized in software. Alternatively, the work entities may be different dedicated hardware processing units. Software can be used to push the decoding of EMIPs onto a queue or queues for these dedicated hardware processing units. Alternatively, dedicated hardware can be used to push the decoding of EMIPs onto a queue or queues for the hardware processing units. The decoding method need not be embodied on a mobile communication device, but rather may be embodied on another device. In one embodiment, the decoding method is performed by a video reader (for example, Windows Media Player) application that executes on a personal computer. The decoding method can be performed by video decoding hardware and/or software embodied in televisions, video disc players, and other video decoding and viewing devices. Accordingly, various modifications, adaptations, and combinations of the various features of the described specific embodiments can be practiced without departing from the scope of the invention as set forth in the claims.

What is claimed is:

1. A method, comprising:
(a) receiving video information for a plurality of frames, wherein the video information for one of the frames comprises a plurality of encoded macroblock information portions (EMIPs), wherein some of said EMIPs are inter-encoded, and wherein others of said EMIPs are intra-encoded;
(b) identifying one or more of the EMIPs of said one frame that have no predecessor EMIPs that have not been decoded, the identifying using a predecessor table having a predecessor count value for each EMIP of the frame, wherein the predecessor count value for a particular EMIP indicates a number of predecessor EMIPs that have not yet been decoded;
(c) initiating a decoding of each EMIP identified in (b); and
(d) returning to (b) after the decoding of any EMIP that was initiated in (c) is at least substantially completed, wherein (b), (c) and (d) are performed multiple times with simultaneous decoding of a plurality of intra-encoded EMIPs.

2. The method of claim 1, wherein the video information comprises at least one of: H.264 video information and MPEG4 video information.

3. The method of claim 1, wherein the decoding initiated in (c) comprises: 1) generating a prefiltered reconstructed macroblock of pixel information, and 2) deblock filtering the prefiltered reconstructed macroblock of pixel information to generate a filtered reconstructed macroblock of pixel information.

4. The method of claim 3, wherein the returning to (b) occurs at the same time as the deblock filtering is occurring.

5. The method of claim 3, wherein the returning to (b) occurs after the deblock filtering has been completed.

6. The method of claim 3, wherein upon the substantial completion in (d), an amount of the prefiltered reconstructed macroblock of pixel information is stored, and wherein the amount of stored information is later used in an intra-decoding of another of said EMIPs of said frame.

7. The method of claim 1, wherein the simultaneous decoding of the plurality of intra-encoded EMIPs involves a decoding of first intra-encoded EMIP and a decoding of a second intra-encoded EMIP, the decoding of the first intra-encoded EMIP taking longer than the decoding of the second intra-encoded EMIP.

8. The method of claim 1, further comprising:
decrementing the predecessor count value for an intra-encoded EMIP upon the completion or substantial completion of a decoding of one of its predecessor EMIPs.

9. The method of claim 1, wherein (b) involves identifying a plurality of EMIPs of said one frame that have no predecessor EMIPs that have not been decoded, and wherein (c) involves initiating a decoding of each of the plurality of EMIPs identified in (b).

10. The method of claim 1, wherein the frame is a frame of luminance information, the video information further comprising two frames of chrominance information that correspond to the frame luminance information.

11. The method of claim 1, wherein the initiating of (c) involves: 1) initiating decoding of a first EMIP by a first thread, and 2) initiating decoding of a second EMIP by a second thread.

12. The method of claim 1, wherein the initiating of (c) involves: 1) initiating decoding of a first EMIP by a first hardware decoding engine, and 2) initiating decoding of a second EMIP to a second hardware decoding engine.

13. The method of claim 1, wherein the video information received in (a) comprises a stream of Network Abstraction Layer (NAL) units.

14. The method of claim 1, wherein the video information is stored in a memory, and wherein the video information is received in (a) onto a baseband processing integrated circuit from the memory.

15. A non-transitory processor-readable medium comprising instructions that when executed perform a method comprising:
(a) receiving video information for a plurality of frames, wherein the video information for one of the frames comprises a plurality of encoded macroblock information portions (EMIPs), wherein some of said EMIPs are inter-encoded, and wherein others of said EMIPs are intra-encoded;
(b) identifying one or more of the EMIPs of said one frame that have no predecessor EMIPs that have not been decoded, wherein identifying one or more of the EMIPs uses a predecessor table having a predecessor count value for each EMIP of the frame, and wherein the predecessor count value for a particular EMIP indicates a number of predecessor EMIPs that have not yet been decoded;

(c) initiating a decoding of each EMIP identified in (b); and (d) returning to (b) after the decoding of any EMIP that was initiated in (c) is at least substantially completed, wherein (b), (c) and (d) are performed multiple times with simultaneous decoding of a plurality of intra-encoded EMIPs.

16. The non-transitory processor-readable medium of claim 15, wherein the decoding of the amount of video information generates a reconstructed frame of luminance information.

17. The non-transitory processor-readable medium of claim 15, wherein the video information is taken from the group consisting of: H.264 video information, MPEG4 video information.

18. A system comprising:

a plurality of work entities configured to receive and decode video information for a plurality of frames, wherein the video information for one of the frames comprises a plurality of encoded macroblock information portions (EMIPs), wherein some of said EMIPs are inter-encoded, and wherein others of said EMIPs are intra-encoded; and a control entity operable to identify using a predecessor table one or more of the EMIPs of said one frame that have no predecessor EMIPs that have not been decoded, and to initiate a decoding by the work entities of each EMIP identified, the predecessor table including a predecessor count value for each EMIP of the frame, wherein the predecessor count value for a particular EMIP indicates a number of predecessor EMIPs that have not yet been decoded, wherein the control entity is configured to identify using the predecessor table additional EMIPs of said one frame that have no predecessor EMIPs after the decoding of any EMIP identified is at least substantially completed, and wherein the control entity is further configured to identify EMIPs having no predecessor EMIPs and to initiate their decoding multiple times with simultaneous decoding by the plurality of work entities of a plurality of intra-encoded EMIPs.

19. The system of claim 18, wherein the work entities are taken from the group consisting of: threads of instructions, dedicated hardware processing units.

20. The system of claim 18, wherein the encoded video information that is received onto the system is taken from the group consisting of: H.264 video encoded information, MPEG4 video encoded information.

21. The system of claim 18, wherein the control entity decrements the predecessor count value of the predecessor table for an intra-encoded EMIP upon the completion or substantial completion of a decoding of one of its predecessor EMIPs.

22. The system of claim 18, wherein the system is taken from the group consisting of: a baseband processor integrated circuit, a video CODEC (enCOder/DECoder) integrated circuit, a personal computer and video decoding application layer software executing on the personal computer.

23. A system comprising:

means for receiving and decoding video information for a plurality of frames, wherein the video information for one of the frames comprises a plurality of encoded macroblock information portions (EMIPs), wherein some of said EMIPs are inter-encoded, and wherein others of said EMIPs are intra-encoded; and means for identifying one or more of the EMIPs of said one frame that have no predecessor EMIPs that have not been decoded, and to initiate a decoding by the means for receiving and decoding of each EMIP identified, the means for identifying using a predecessor table having a predecessor count value for each EMIP of the frame, wherein the predecessor count value for a particular EMIP indicates a number of predecessor EMIPs that have not yet been decoded, wherein the means for identifying is configured to identify using the predecessor table additional EMIPs of said one frame that have no predecessor EMIPs after the decoding of any EMIP identified is at least substantially completed, and wherein the means for identifying is further configured to identify EMIPs having no predecessor EMIPs and to initiate their decoding multiple times with simultaneous decoding by the means for receiving and decoding of a plurality of intra-encoded EMIPs.

24. The system of claim 23, wherein the means for identifying the one or more of the EMIPs of said one frame that have no predecessor EMIPs is further configured to decrement the predecessor count value of the predecessor table for an intra-encoded EMIP upon the completion or substantial completion of a decoding of one of its predecessor EMIPs.

25. A method comprising:

(a) receiving video information for a plurality of frames, wherein the video information for one of the frames comprises a plurality of encoded macroblock information portions (EMIPs), wherein some of said EMIPs are inter-encoded, and wherein others of said EMIPs are intra-encoded;

(b) identifying one or more of the EMIPs of said one frame that have no predecessor EMIPs that have not been decoded;

(c) initiating a decoding of each EMIP identified in (b), the decoding comprising generating a prefiltered reconstructed macroblock of pixel information and deblock filtering the prefiltered reconstructed macroblock of pixel information to generate a filtered reconstructed macroblock of pixel information; and (d) returning to (b) after the decoding of any EMIP that was initiated in (c) is at least substantially completed, wherein steps (b), (c) and (d) are performed multiple times with simultaneous decoding of a plurality of intra-encoded EMIPs, and wherein the returning to (b) occurs at the same time that the deblock filtering is occurring.

26. The method of claim 25, wherein the video information comprises at least one of: H.264 video information and MPEG4 video information.

27. The method of claim 25, wherein upon the substantial completion of step (d), storing an amount of the prefiltered reconstructed macroblock of pixel information, and wherein the amount of stored information is later used in intra-decoding of another of said EMIPs of said frame.

28. The method of claim 25, wherein the simultaneous decoding of the plurality of intra-encoded EMIPs involves a decoding of first intra-encoded EMIP and a decoding of a second intra-encoded EMIP, the decoding of the first intra-encoded EMIP taking longer than the decoding of the second intra-encoded EMIP.

29. The method of claim 25, further comprising:
decrementing the predecessor count value for an intra-encoded EMIP upon the completion or substantial completion of a decoding of one of its predecessor EMIPs.

30. The method of claim 25, wherein (b) involves identifying a plurality of EMIPs of said one frame that have no predecessor EMIPs that have not been decoded, and wherein (c) involves initiating a decoding of each of the plurality of EMIPs identified in (b).

31. The method of claim 25, wherein the frame is a frame of luminance information, the video information further comprising two frames of chrominance information that correspond to the frame luminance information.

32. The method of claim 25, wherein the initiating of (c) involves: initiating decoding of a first EMIP by a first thread, and initiating decoding of a second EMIP by a second thread.

33. The method of claim 25, wherein the initiating of (c) involves: initiating decoding of a first EMIP by a first hardware decoding engine, and initiating decoding of a second EMIP to a second hardware decoding engine.

34. The method of claim 25, wherein the video information received in (a) comprises a stream of Network Abstraction Layer (NAL) units.

35. The method of claim 25, wherein the video information is stored in a memory, and wherein the video information is received in (a) onto a baseband processing integrated circuit from the memory.

36. A system comprising:
a plurality of work entities configured to receive video information for a plurality of frames, wherein the video information for one of the frames comprises a plurality of encoded macroblock information portions (EMIPs), wherein some of said EMIPs are inter-encoded, and wherein others of said EMIPs are intra-encoded; and
a control entity operable to identify one or more of the EMIPs of said one frame that have no predecessor EMIPs that have not been decoded, and to initiate a decoding by the work entities of each EMIP identified, the decoding comprising generating a prefiltered reconstructed macroblock of pixel information and deblock filtering the prefiltered reconstructed macroblock of pixel information to generate a filtered reconstructed macroblock of pixel information,
wherein the control entity is configured to identify additional EMIPs of said one frame that have no predecessor EMIPs after the decoding of any EMIP identified is at least substantially completed, the identifying additional EMIPs occurring at the same time as the deblock filtering is occurring,
and wherein the control entity is further configured to identify EMIPs having no predecessor EMIPs and to initiate their decoding multiple times with simultaneous decoding by the plurality of work entities of a plurality of intra-encoded EMIPs.

37. The system of claim 36, wherein the work entities are taken from the group consisting of: threads of instructions, dedicated hardware processing units.

38. The system of claim 36, wherein the encoded video information that is received onto the system is taken from the group consisting of: H.264 video encoded information, MPEG4 video encoded information.

39. The system of claim 36, wherein the control entity is operable to identify the one or more of the EMIPs of said one frame that have no predecessor EMIPs that have not been decoded using a predecessor table, the predecessor table including a predecessor count value for each EMIP of the frame, wherein the predecessor count value for a particular EMIP indicates a number of predecessor EMIPs that have not yet been decoded.

40. The system of claim 39, wherein the control entity decrements the predecessor count value of the predecessor table for an intra-encoded EMIP upon the completion or substantial completion of a decoding of one of its predecessor EMIPs.

41. The system of claim 36, wherein the system is taken from the group consisting of: a baseband processor integrated circuit, a video CODEC (enCOder/DECoder) integrated circuit, a personal computer and video decoding application layer software executing on the personal computer.

* * * * *